Patented June 25, 1940

2,205,449

UNITED STATES PATENT OFFICE 2,205,449

TREATING VINYLIDENE CHLORIDE POLYMERS

Ralph M. Wiley, Midland, Mich., assignor to The Dow Chemical Company, Midland, Mich., a corporation of Michigan No Drawing. Application March 4, 1938, Serial No. 193,917

2 Claims. (Cl. 18—48)

This invention relates to a method of treating articles fabricated from polymerized vinylidene chloride and polymers thereof prepared with other polymerizable materials to increase the tensile strength of the same.

I have found that a marked increase in the tensile strength of articles prepared from the aforementioned polymers can be accomplished by immersing the articles in a liquid which is a non-solvent for said polymers for a suitable period of time, said liquid being maintained at a temperature above the softening temperature of the polymeric body. The articles should be removed from the hot treating bath when they have reached the desired temperature, and then cooled to room temperature, the cooling preferably being quite rapid.

The temperature of the non-solvent bath is preferably maintained at least 20° C. above the softening temperature of the particular polymer or co-polymer being treated. Since the softening temperatures of the various polymers range from about 130° C. to about 230° C. the bath will be maintained, in general, between about 150° C. and about 250° C. However, these limits can be extended, provided they do not drop below the softening temperature as the lower limit and preferably, but not necessarily, do not exceed the decomposition temperature of the polymeric body as the upper limit.

The time required for this heating will vary with the thickness of the piece being treated as well as with the temperature gradient between the hot liquid and the polymers. For example, a sheet of polymeric vinylidene chloride $\frac{1}{16}$-inch thick will reach a temperature of 200° C. after about 30 seconds immersion in a liquid medium maintained at 220° C. Under the same conditions a ½-inch thick sheet requires about 3 minutes. In general, the polymeric body should be immersed in the liquid bath for a period of time sufficient to reach its softening temperature. Some of these particular conditions are illustrated by the following examples:

Example 1

A vinylidene chloride-vinyl chloride co-polymer containing 10 per cent by weight of phenoxypropylene oxide as plasticizer, and having a softening point of 150° C., was molded at 155° C. to a sheet 0.10 inch thick. The sheet was cooled, removed from the mold, and dipped in glycerine at 175° C. for 60 seconds. It was then chilled in water at 20° C. Strips cut from the treated sheet had a tensile strength of 5000 pounds per square inch after standing for 48 hours. Strips cut from the sheet before the glycerine treatment had a tensile strength of 3700 pounds per square inch after standing for 48 hours.

Example 2

Example 1 was repeated using 3 per cent plasticizer instead of 10 per cent. Strips cut from the treated sheet had a tensile strength of 6700 pounds per square inch after standing 72 hours. Strips cut from the untreated sheet had a tensile strength of 4000 pounds per square inch after standing 72 hours.

Example 3

A vinylidene chloride polymer polymerized at 35° C. in the presence of 10 per cent hexachlorodiphenyl oxide and 0.5 per cent benzoyl peroxide was cast at 155° C. to a film on a magnesium metal plate from a 5 per cent solution of the polymer in ortho-dichlorobenzene and dried to remove the solvent. This film was 0.002 inch thick, slightly cloudy when dry, and gave a tensile strength of 2100 pounds per square inch. A similar film cast from the solution under the same conditions was heat treated according to my process before removing from the plate by dipping in a glycerine bath at 220° C. for 30 seconds, followed immediately by dipping in water. This treated film was clear, softer and tougher than the untreated film. Its tensile strength was 6200 pounds per square inch at the end of 30 minutes.

The co-polymers used can be those of vinylidene chloride with vinyl esters, divinyl ether, styrene, acrylic acid esters, and other polymerizable materials.

The non-solvent liquid can be any liquid which can be used with convenience. Of course, the boiling point of the chosen liquid must be above the temperature desired for the treatment. Glycerine is recommended since it has no solvent action on the polymer or co-polymers and its boiling point of 290° C. is sufficiently high to take care of practically all operating conditions. Other liquids which have been found suitable are ethylene glycol, certain low melting salts and salt mixture, such as a mixture of 8 parts sodium chloride and 92 parts ammonium nitrate, a mixture of 21 parts sodium nitrate and 79 parts of ammonium nitrate, etc.; and hydrocarbon liquids such as lubricating oils and the like.

I have found that the present process is applicable to the treatment of articles fabricated from the polymer and co-polymers of vinylidene chloride with plasticizers, coloring agents, fillers, stabilizing agents, and the like.

The new process, although applicable to all molded articles from polymeric and co-polymeric vinylidene chloride, is particularly adapted to the manufacture of tough films and tough filaments, advantageously employed for a variety of purposes, especially where the characteristic resistance of polymeric vinylidene chloride to the attack of chemical reagents is desired.

Other modes of applying the principle of my invention may be employed without departing from the spirit of the invention, providing the step or steps stated by any of the following claims or the equivalent of such stated step or steps be employed.

I therefore particularly point out and distinctly claim as my invention:

1. The method which includes immersing a shaped article of polymeric or co-polymeric vinylidene chloride in a bath of a non-solvent liquid which is at a temperature above the softening point but below the decomposition point of the said article, thereby heating the article to its softening point, removing the article from the bath when it has reached the softening point, and rapidly cooling the article to room temperature, the so treated product having a tensile strength substantially greater than that of the untreated article.

2. The method as claimed in claim 1 wherein the nonsolvent liquid is glycerine.

RALPH M. WILEY.